United States Patent
Downer et al.

(12) 
(10) Patent No.: US 6,223,244 B1
(45) Date of Patent: Apr. 24, 2001

(54) METHOD FOR ASSURING DEVICE ACCESS TO A BUS HAVING A FIXED PRIORITY ARBITRATION SCHEME

(75) Inventors: Wayne Alan Downer, Portland; Richard Lindsley, Aloha; Steven Rino Carbonari, Beaverton, all of OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/209,966

(22) Filed: Dec. 10, 1998

(51) Int. Cl.$^7$ ............................................. G06F 13/14
(52) U.S. Cl. ..................... 710/244; 710/240; 710/121; 710/114; 710/111; 710/40
(58) Field of Search .................... 710/114, 121, 710/111, 113, 240, 40, 44, 47, 244, 128, 129, 119, 116, 5, 107, 123; 711/151, 158

(56) References Cited

U.S. PATENT DOCUMENTS

| | | |
|---|---|---|
| 4,257,095 | 3/1981 | Nadir . |
| 4,785,394 * | 11/1988 | Fischer . |
| 4,972,313 * | 11/1990 | Getson, Jr. et al. ................ 710/125 |
| 5,204,951 | 4/1993 | Keener et al. . |
| 5,546,550 | 8/1996 | Carter . |
| 5,613,076 | 3/1997 | Latif et al. . |
| 5,715,406 * | 2/1998 | Henson et al. ...................... 710/107 |
| 5,754,887 * | 5/1998 | Damron et al. ..................... 710/39 |
| 6,016,528 * | 1/2000 | Jaramillo et al. .................... 710/243 |

OTHER PUBLICATIONS

"SCSI Primer," *Understanding I/O Subsystems*, by D. Schwanderer and A. Wilson, Jr., chapter 7, pp. 113–131.

* cited by examiner

Primary Examiner—Ario Etienne
(74) Attorney, Agent, or Firm—Klarquist Sparkman Campbell Leigh and Whinston LLP (57) ABSTRACT

Computer-based devices, whether initiators or targets, are assured access to a bus having a fixed priority arbitration scheme (such as a SCSI bus) by assigning to each initiator a "fair share" of the bus bandwidth. This share is defined as a number of bytes per a unit of time such as a time period. The shares together total a fraction of the total bus bandwidth, with a margin of bus bandwidth left unassigned. To prevent initiator starvation, each initiator monitors its bus requests to determine if it is being prevented by higher-priority initiators from using its assigned share of the bandwidth. If not, the initiator periodically pings each higher-priority initiator to indicate that it is not being starved. So long as a higher-priority initiator continues to receive pings from all lower-priority initiators, the higher-priority initiator can continue to use as much bandwidth as it needs. If the higher-priority initiator fails to receive a ping from a lower-priority initiator, it stops sending new bus requests to the SCSI bus, making the bandwidth available to the lower-priority initiator. To prevent target starvation, each initiator monitors its outstanding bus requests to targets. If a request does not complete in an appropriate time, the initiator pings all other initiators with notification of target starvation. In response, all initiators limit their new bus requests to their share of the bandwidth. This limiting makes the unassigned margin of bus bandwidth available to the targets.

23 Claims, 9 Drawing Sheets

METHOD FOR ASSURING DEVICE ACCESS TO A BUS HAVING A FIXED PRIORITY ARBITRATION SCHEME

FIELD OF THE INVENTION

This invention relates generally to bus arbitration schemes for computer systems and, more particularly, to a method for assuring device access to a bus having a fixed priority arbitration scheme including but not limited to the bus defined by the Small Computer Serial Interface (SCSI) standard.

BACKGROUND OF THE INVENTION

The SCSI standard describes a well-defined peripheral bus that is independent of computer system buses such as ISA buses, EISA buses, VESA Local Buses, and PCI buses. The SCSI bus is a shared, contention-based resource. Unlike computer system buses, a SCSI bus contains no clock signal, allowing data transfers to accommodate different speed devices with no impact on devices with faster transfer rates. SCSI decouples peripheral device design from system bus design, allowing users to take advantage of system bus advancement while preserving their investment in peripheral devices.

The SCSI definition allows up to eight SCSI device bus connections or up to 16 connections for the Wide SCSI variation. A SCSI device connects to a SCSI bus via the device's controller and may be either a peripheral device or a host computer. Thus, up to eight devices can connect to a narrow SCSI bus. More typically, one or more host computers connect to one or more peripheral devices through a SCSI bus. This arrangement allows users to upgrade presently-connected devices or add new devices to the bus without changing the devices already connected to the bus.

SCSI devices are either initiators or targets, or both. Initiators are devices such as a host computer that initiate and deliver requests for tasks for fulfillment. If a device can be both an initiator and target, it may only behave on the bus as one at any instant. Targets are devices such as a disk drive or tape drive that perform requested tasks.

SCSI devices communicate with one another using a well-defined protocol involving sequential states called phases. SCSI buses can only be in one phase at a time and buses enter most phases only after exiting previous specific states. Initiators communicate with targets through bus requests called commands. Thereafter, the targets control request resolution. After receiving a command, but before fulfilling it, a target may disconnect from the bus. This allows initiators to perform other work (such as issuing commands to other targets) as the target performs internal processing.

The SCSI architecture allows two, and only two, devices to communicate with each other over its bus simultaneously. A single device cannot broadcast to two or more devices simultaneously, and no conference calls are permitted. Each SCSI device has a unique bus ID which users set using switches, jumpers, or set-up routines. SCSI IDs range from seven (highest priority device ID) to zero (lowest priority device ID) for regular SCSI and up to 15 for the Wide SCSI variation. With wide SCSI the priority is from seven (highest priority device ID) to zero followed by 15 to eight (lowest priority device ID). Hosts typically have the highest SCSI bus ID, allowing them to initiate requests with minimum peripheral device interference.

To obtain bus control, devices must wait for the bus to achieve a bus free phase which indicates that the bus is idle. Devices then arbitrate for bus control. To begin the arbitration phase, each interested device detects a bus free phase. It then places its bus ID on the bus by asserting its associated data bus signal (i.e., device seven asserts a signal on data line seven while device two asserts a signal on data line two). After a brief delay, the device with the highest bus ID value signals its victory and directs lower-priority devices to the back off the bus. The winning device then proceeds through a number of additional phases to complete its task. The losing device must wait for the bus to achieve another bus free phase, at which time it again asserts its associated data bus signal in an attempt to gain control of the SCSI bus.

The specifics of the SCSI standard are explained in a number of works such as the standard itself (ANSI X3.131-1994 and later versions) and *Understanding I/O Subsystems*, by D. Schwanderer and A. Wilson Jr., which are hereby incorporated by reference. Further background information on SCSI is given in U.S. Pat. No. 5,613,076, which is also hereby incorporated by reference.

While simple to implement, the fixed priority arbitration scheme of SCSI has a significant drawback. Higher-priority devices always get access first, possibly preventing lower-priority devices from gaining sufficient access to the SCSI bus to perform properly. The potential for this adverse effect on lower-priority devices, known as "access starvation," "initiator starvation," or "target starvation," has become much greater recently because newer devices move more data onto the SCSI bus faster. Consequently, higher-priority devices tend to monopolize the SCSI bus by consuming most, if not all, of the SCSI bus bandwidth. The bus bandwidth is defined as the number of bytes per second the bus can transfer. SCSI bandwidths range from a low of 3 megabytes (Mbytes) per second for SCSI-1 buses to 20 to 40 Mbytes per second for Ultra SCSI buses.

An objective of the invention, therefore, is to provide an efficient method for assuring bus access to all devices connected to a bus having a fixed priority arbitration scheme. Another objective of the invention is to assure that lower-priority devices have access to a minimum "fair share" of the bus bandwidth.

SUMMARY OF THE INVENTION

In accordance with the invention, a method is described and shown herein for assuring device access to a bus having a fixed priority arbitration scheme such as a SCSI bus. The method includes determining if a first device is prevented from gaining sufficient access to the bus by a second device, and, if so, notifying the second device to limit sending new requests to the bus.

The method has multiple aspects. In one aspect, the method includes assigning to a lower-priority device such as an initiator a share of the bus bandwidth. A determination is then made whether the lower-priority device is prevented from using its share of the bus bandwidth by the higher-priority device. If so, the lower-priority device notifies the higher-priority device to limit new requests to the bus. The notifying may include failing to send an access signal from the lower-priority device to the higher-priority device. The limiting of requests may include stopping new requests by the higher-priority device.

In another aspect, the method includes assigning to a higher-priority device such as an initiator a share of the bus bandwidth. A determination is then made if a lower-priority device such as a target is prevented from gaining access to the bus for a specified time. If so, the higher-priority device is notified to limit the sending of new requests to the bus.

The notifying may include sending a signal to the higher-priority device that the lower-priority device does not have sufficient access to the bus. The limiting of requests may include limiting new requests by the higher-priority device to its share of the bus bandwidth.

These and other aspects of the invention are described and shown in the following description and drawings.

DETAILED DESCRIPTION OF AN ILLUSTRATIVE EMBODIMENT

Figure 1:
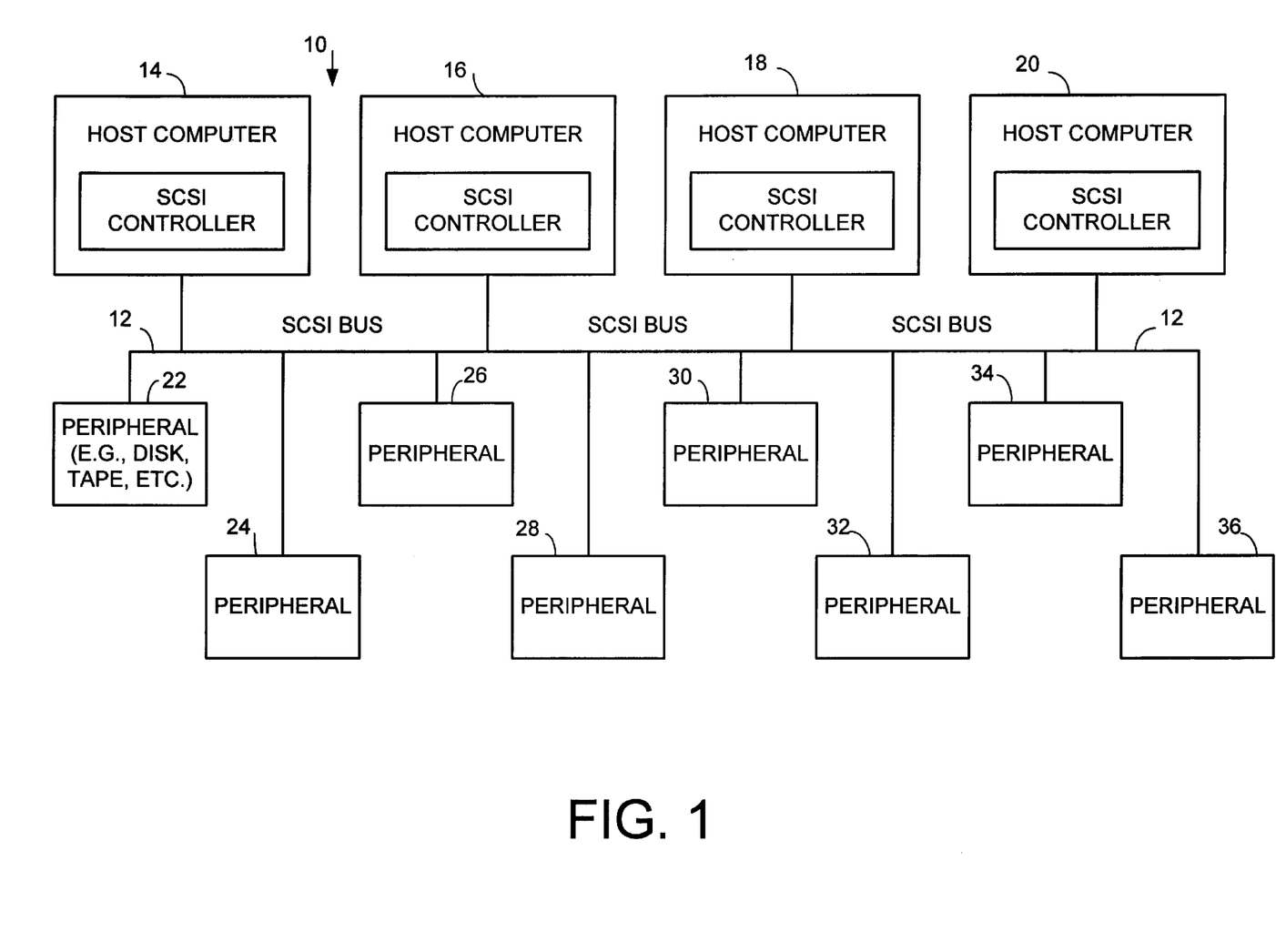
FIG. 1 is a block diagram of a computer system in accordance with the invention including a SCSI bus, initiator and target devices connected to the bus, and SCSI controllers within the initiator devices.

FIG. 1 is a block diagram of a computer system 10 that includes a conventional Wide SCSI bus 12 that allows up to 16 SCSI devices to be connected to the bus. A SCSI device communicates with a SCSI bus via the device's controller and may be either a peripheral device such as a disk drive or a host device such as a computer. In FIG. 1 four hosts in the form of computers 14, 16, 18, and 20 are connected to the bus 12 via their respective SCSI controllers. Computers 14–20 are the initiators in computer system 10 because each device can initiate and deliver requests to targets for fulfillment. The terms "initiator" and "computer" are used interchangeably hereafter to describe computers 14–20. Eight peripheral devices 22–36 are also connected to the SCSI bus and include devices such as tape or disk drives. Peripheral devices 22–36 are the targets in computer system 10 because they execute tasks requested by initiators. The terms "target" and "peripheral" are used interchangeably hereafter to describe peripheral devices 22–36. Technically, computers 14–20 are targets as well when receiving pings or polls from other computers within the group 14–20 as described herein. But for purposes of the invention, it is their role as initiators that is of interest and is described herein.

The computer system 10, is of course, only an illustrative embodiment of the invention. The invention is not restricted to a computer system of this type. And while the invention may find most use with the well-known SCSI bus, its use is not limited to such a bus. It may be used with any type of bus that has a fixed priority arbitration scheme.

The SCSI controllers for computers 14–20 are shown in FIG. 1 because the invention is implemented in the illustrative embodiment in software executed by these controllers. Peripheral devices 22–36 also include SCSI controllers, but they are not shown because they are conventional in design and operation.

Overview

In accordance with the invention, each initiator on SCSI bus 12 is entitled to a "air share" of the available SCSI bus bandwidth, which bandwidth is less than the total bandwidth by some margin. This share is defined in terms of kilobytes (Kbytes) per ping period. A ping period is the time between pings, which are signals sent from one initiator to another to indicate initiator or target starvation. In the illustrative embodiment the ping is in the form of a unique command sent over the SCSI bus. Other forms of signaling may, of course, be used.

To prevent initiator starvation, an initiator monitors its bus requests to determine if it is being prevented from using its share of the bandwidth. If not, the initiator pings each higher-priority initiator to indicate it is not being starved. This ping is normally sent at t(Ping), the end of each ping period. So long as a higher-priority initiator continues to receive pings from each lower-priority initiator, the higher-priority initiator continues to use as much SCSI bus bandwidth as it needs. However, if the higher-priority initiator fails to receive pings from any lower-priority initiator, it limits its bus requests by stopping the sending of new bus requests until it again receives pings from each lower-priority initiator. When higher-priority initiators stop sending new bus requests, their unused shares of the bus bandwidth plus the unassigned bus bandwidth margin become available to starved initiators. When a starved initiator eventually catches up to its share of the bandwidth, it again pings its higher-priority initiators. The ping notifies the higher-priority initiators that they can again send new bus requests to the SCSI bus.

To prevent target starvation, an initiator monitors its outstanding requests to targets. If an initiator detects requests that do not seem to be completing in an appropriate time, the initiator pings the other initiators with notice of the target starvation. Each initiator responds by limiting its new bus requests to no more than its share of the bus bandwidth. This limiting of bandwidth use makes the unassigned margin of bus bandwidth available to targets. When the initiator no longer detects target starvation, the initiator pings the other initiators without notice of target starvation. The initiators are then free to send new bus requests on the SCSI bus without limitation to prevent target starvation.

A higher-priority initiator polls a lower-priority initiator if the higher-priority initiator fails to receive pings from the lower-priority initiator for an extended time. This might occur, for example, because the lower-priority initiator was deprived of its entire share of the bandwidth for a ping period or if the lower-priority device becomes inoperable. If the poll fails, the lower-priority initiator is assumed to have failed and is removed from the list of valid initiators on the bus. It no longer receives pings from other initiators, and its presence is not taken into account in determining shares of the bandwidth for the initiators. The failed initiator is not considered valid until it again pings the other initiators. If the poll succeeds, the higher-priority initiator will continue to poll the lower-priority initiator until a ping is received from the lower-priority initiator or the poll fails.

As explained in detail below, the pinging and polling of initiators enables initiators and targets to use as much SCSI bus bandwidth as needed unless the onset of starvation is detected. In the case of initiator starvation, the potentially-starving initiator receives its "fair share" of the bandwidth. In the case of target starvation, the unassigned margin of bus bandwidth is available to the potentially-starving target.

In the illustrative embodiment, the process for assuring device access to a SCSI bus has distinct aspects: initiator initialization, the monitoring of SCSI bus access for initiators and targets, and the response to notification of initiator or target starvation. Central to these aspects are pinging and polling.

Initialization

Figure 2:
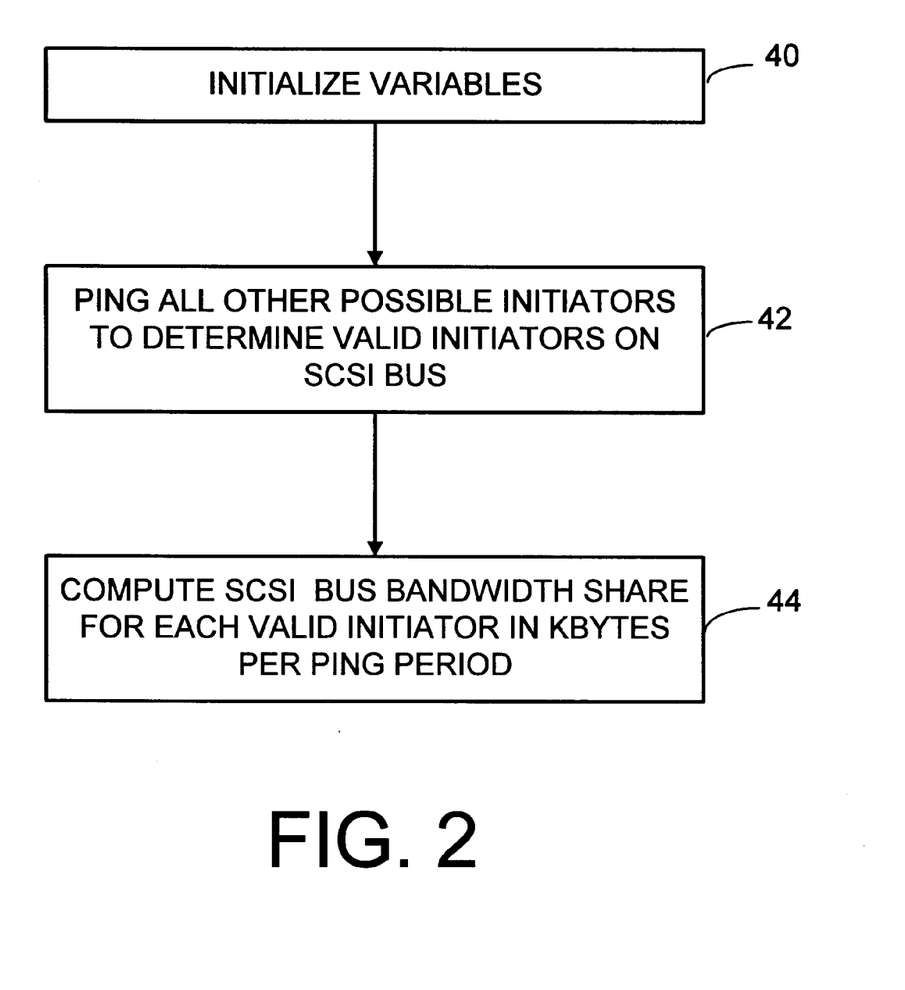
FIG. 2 is a flowchart of a method for initializing SCSI devices in accordance with the invention.

FIG. 2 is a flowchart of an initialization of initiators 14–20 that occurs in accordance with the invention as each of the initiators joins computer system 10. This initialization is executed separately by each of the initiators. The steps shown in FIG. 2 summarize what is more specifically described in the pseudocode of Table 1:

TABLE 1

Initiator Initialization

```
At t(init)
    set Valid(possible); if Valid( ) bits are not contiguous from bit 0,
        set Hilnits
    clear NoPing(all); clear Istarve(all); clear Tstarve(all)
    Ping(all)
    if NoReqs, set SendPing, else clear SendPing
    clear BlockReqs; clear Throttle; LongRespCnt = 0
    if WideBus, BusBW = 20000, else BusBW = 10000
    BusKBperTp = BusBW * BusUtil * t(Ping)
    WorkCnt = WorkUnit = BusKBperTp / Count(Valid(all))
Configuration Parameters
    IDs of all possible initiators    Valid(possible)
    % SCSI bus utilization            BusUtil
    bus width                         WideBus
    time periods                      t(Ping), t(Starve)
```

As part of the initialization, applicable variables are set to initial values (step 40). These variables are shown in Table 1 and include NoPing, Valid, Istarve, Tstarve, and SendPing. In the illustrative embodiment these variables are bit fields, with one bit in each field representing each of the initiators. For example, NoPing for the SCSI controller of initiator 14 includes bits for initiators 16, 18, and 20 that indicate whether initiator 14 has received a ping from these other initiators during the last ping period. NoPing(all) thus indicates that initiator 14 is looking at each of the bits in the field, while NoPing(n) indicates that initiator 14 is looking at a single bit representing a particular initiator. Valid indicates which of the possible initiators are connected to the SCSI bus. Istarve and Tstarve indicate, respectively, whether an initiator or target is starved; that is, not getting sufficient access to the SCSI bus. For an initiator sufficient access is defined in terms of a share of the SCSI bus bandwidth. For a target sufficient access is defined as access to the SCSI bus within a specific time of a bus request. Other definitions may also be used. SendPing indicates whether the initiator should ping the next time the initiator would normally do so. SendPing is set if the ping is to be sent and cleared if the ping is not to be sent (the initiator is starved). In the illustrative embodiment a ping is normally sent at the end of the current ping period t(Ping).

Other initialized variables include Hilnits, NoReqs, BlockReqs, Throttle, and LongRespCnt. Hilnits indicates, when set, that one or more initiators may have a higher priority on the bus than the targets and that target starvation is possible. It should be noted, however, that even in cases where no initiator may have a priority higher than a target and target starvation is not possible, setting Hilnits can significantly reduce the skew in response times between high and low priority targets. NoReqs indicates that there are no initiator requests presently to be placed on the SCSI bus. BlockReqs, when set, prevents an initiator from sending new requests to targets over the SCSI bus. It, however, does not block pings or polls to other initiators. Throttle, when set, limits an initiator to its share of the SCSI bus per ping period; it is cleared on initialization. LongRespCnt keeps a count for determining if a specified time (such as an expected maximum time) for a target to respond to an initiator request has been exceeded. This variable is used in determining target starvation.

An initial available bandwidth BusKBperTp assigned to the initiators is determined in terms of kilobytes (Kbytes) per ping period. BusKBperTp is a fraction of the total SCSI bandwidth BusBW, calculated by multiplying the BusBW by a bus utilization factor BusUtil. The difference between BusBW and BusKBperTp is an unassigned margin of bandwidth that is available to prevent target starvation. The variable WorkUnit represents the assigned share each initiator is entitled to for a given period and is calculated by dividing the available bandwidth BusKBperTp by the number of valid initiators Count. The variable WorkCnt represents the bandwidth available to each initiator at any given time during a ping period. It is initialized to WorkUnit, but changes during computer system operation to reflect use or starvation by an initiator.

The ping period t(Ping) and initiator starvation period t(Starve) are time periods that are also set at initialization. The ping period is the time between pings and the starvation period is the time by which a ping should be received by a higher-priority initiator from a lower-priority initiator or the lower-priority initiator will be considered starved. The starvation period should be greater than the ping period to insure that a ping is normally seen within each starvation period.

Returning to FIG. 2, each initiator during its initialization pings all other possible initiators to determine what valid initiators are presently on the SCSI bus (step 42). In Table I this step is represented by Ping(all). "Ping" in the illustrative embodiment means the sending of an access signal on the SCSI bus from a first initiator to a second initiator to notify the second initiator that the first initiator is not starved for bus access. Other forms of pinging may be used. The access signal also indicates whether a target of the pinging initiator is starved. Pings, as will be explained, are sent only to higher-priority initiators unless one or more possible initiators has higher priority than a target (Hilnits set), making target starvation possible. In that case the pinging initiator pings all other initiators regardless of priority.

Each initiator records the pings it receives in Valid and uses this information to compute its share of the SCSI bus bandwidth (step 44).

This share is represented by the variable WorkUnit and is defined, as described above, in terms of Kbytes per ping period. In computer system in FIG. 1, for example, assume that the SCSI bus 12 has a bandwidth of 20 Mbytes per second, the bus utilization factor is set at 0.80, the ping period is 200 milliseconds, and the number of valid initiators on the SCSI bus is four. Each initiator then has the following bandwidth share on initialization:

$$WorkUnit = 20 \text{ Mbytes per sec.} * .80 * (.2 \text{ sec. per ping period})/4$$

$$= 800 \text{ Kbytes per ping period.}$$

This bandwidth share is not solely for use of the associated initiator. If the initiator does not require its share in a given ping period, other initiators may use the bandwidth.

Pinging and Polling Initiators

Figure 3:
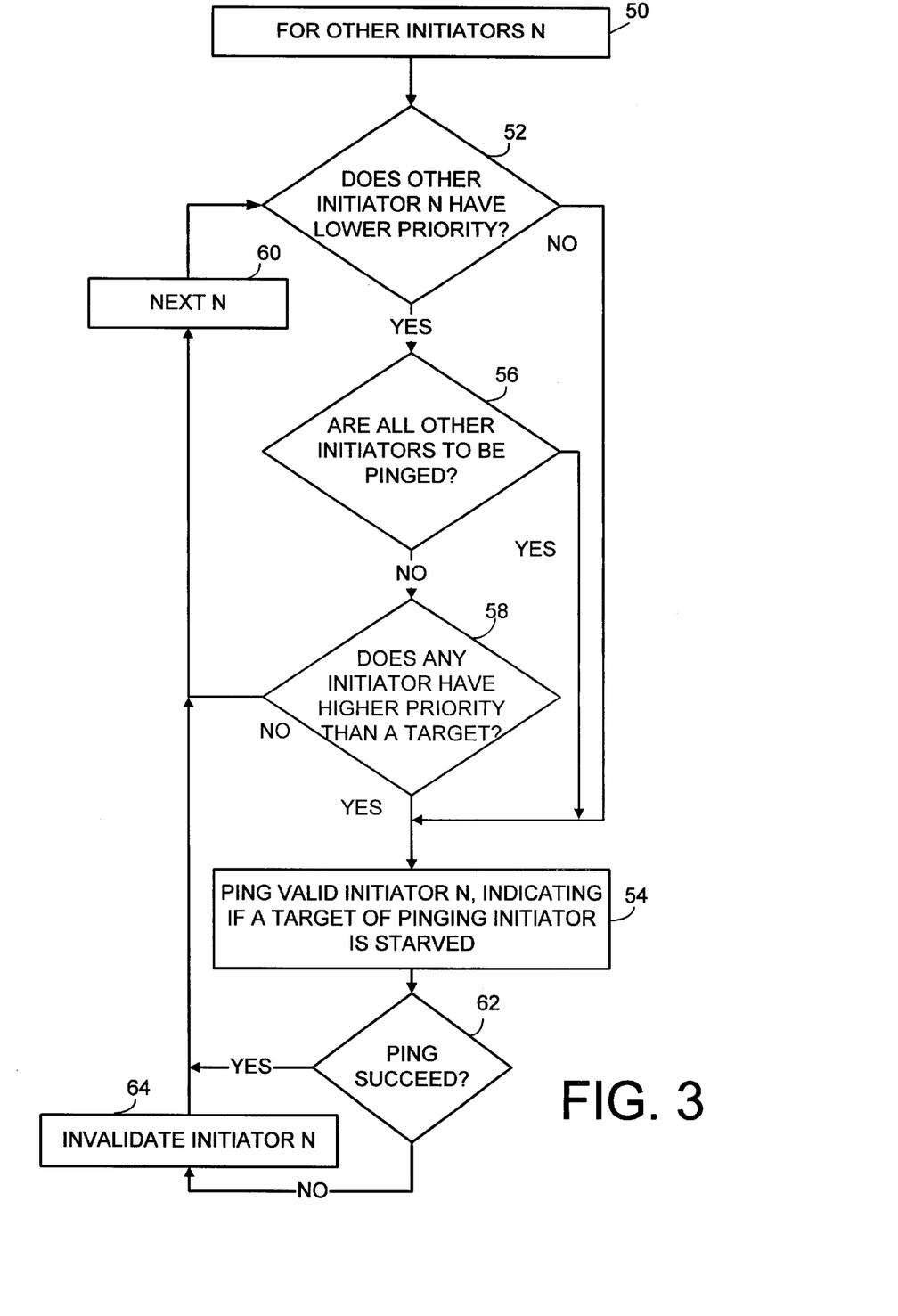
FIG. 3 is a flowchart of a method of sending pings in accordance with the invention.

FIG. 3 is a flowchart that summarizes the action that occurs when an initiator pings other initiators, such as at the end of each ping period. Pseudocode describing the details of this action is shown in Table 2:

TABLE 2

Pinging

Ping( )
    for all n, if ((n < me and not(Ping(all) or Hilnits)) or (n= =me))
        next n
        else, (if Valid(n), Ping(n, Tstarve(me)))
            if Ping(n) fails, clear Valid(n)
    clear ImmedPing When an initiator sends a ping, it sends a separate ping to each other valid initiator that needs ongoing notification (step 50). The pinging initiator first checks if other initiator n has a lower priority (step 52). If not, the initiator pings the other, higher-priority initiator, indicating in the ping if a target of the pinging initiator is starved (step 54). The starve information is contained in Tstarve. If, on the other hand, other initiator n has a lower priority than the pinging initiator, the ping is sent only if either of two conditions are present. The pinging initiator checks if it is to ping the initiator regardless of priority (step 56), such as in the case of initiator initialization. The initiator also checks if the Hilnits variable is set (step 58), indicating one or more initiators have a higher priority on the SCSI bus than one or more targets. If set, a ping is sent to all other initiators since target starvation is possible. If neither of these two conditions is met, then no ping is sent to the lower-priority initiator, and the pinging initiator then examines the next other initiator n (step 60).

The initiator checks to see if the ping succeeds (step 62). If the ping fails (no acknowledgement to pinging initiator that the ping was received), the pinged initiator is considered invalid (step 64) and remains so considered until a ping or response to a poll is received from that initiator. The initiator also clears its ImmedPing variable. ImmedPing, if set when read by an initiator, causes the initiator to send a ping immediately rather than waiting for the end of a ping period. It is used when an initiator has "caught up" to the other initiators by consuming a past share it was earlier denied and its present share. Since in this case the initiator has pinged, it cannot be starved and it clears ImmedPing to prevent the initiator from immediately pinging if it consumes its share during the next ping period.

Figure 4:
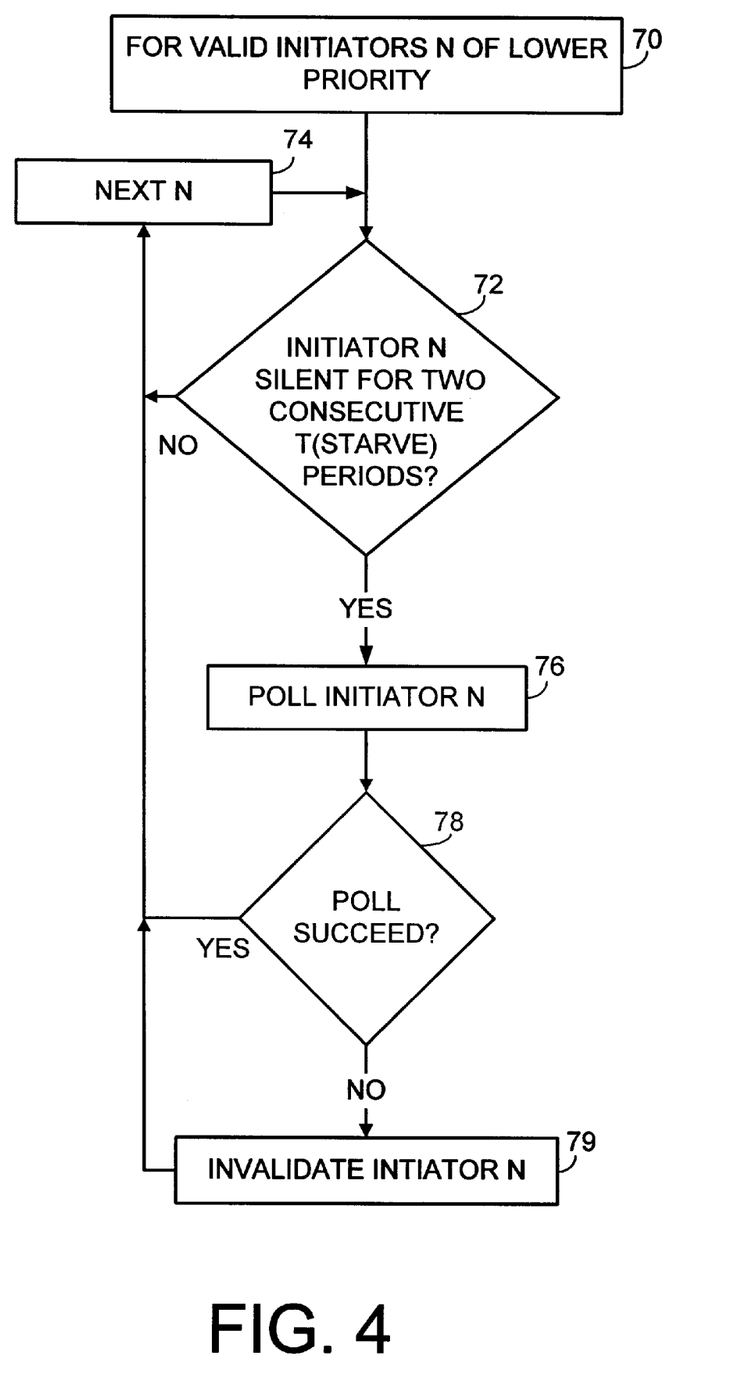
FIG. 4 is a flowchart of a method of sending polls in accordance with the invention.

FIG. 4 is a flowchart summarizing the action that occurs when an initiator polls other initiators. Pseudocode describing the details of this action is shown in Table 3:

TABLE 3

Polling

Poll( )
    for n < me, if Istarve(n) and Valid(n), Poll (n)
        if Poll(n) fails, clear Valid(n)
    if Tstarve(all) and Valid(all), set Throttle, else clear Throttle
    if not(Istarve(all) and Valid(all)) and not(Throttle), clear BlockReqs When an initiator conducts a poll, it polls only lower-priority initiators (step 70). The polling initiator checks a lower-priority initiator to determine if it has been silent for two consecutive t(Starve) periods (step 72). If not, the polling initiator proceeds to examine the next lower-priority initiator (step 74). If, however, the lower-priority initiator has been silent for the specified time, the polling initiator polls the lower-priority initiator by sending it a command to acknowledge (step 76). The polling initiator then waits to see if the polled initiator responds to the command (poll succeeds) (step 78). If it does, the polled initiator is recognized as valid (and starved), and the polling initiator proceeds to examine the next lower-priority initiator (step 74). If the poll fails, the polled initiator is considered invalid and removed from the polling initiator's list of valid initiators (step 79). The polled initiator is then considered invalid until the polling initiator receives a ping from it in the future.

The pseudocode of Table 3 also indicates the following actions occur after each poll. If the polling of valid initiators indicates there is target starvation, the Throttle variable is set to limit all initiators to their share of the SCSI bus bandwidth (defined by WorkUnit). If no valid initiators indicate target starvation, the Throttle variable is cleared. Additionally, if after the polling no valid initiator is starved and the Throttle variable is seen to be cleared, the BlockReqs variable is cleared. This clear of BlockReqs allows higher-priority initiators that were blocked to again access the SCSI bus.

Monitoring SCSI Bus Access for Initiators and Targets

SCSI bus activity is monitored on the basis of the two time periods t(Ping) and t(Starve) that in the illustrative embodiment run concurrently and asynchronously. As stated, the period of t(Starve) should be greater than that of t(Ping) to insure that a ping is normally seen within each t(Starve) period. Through monitoring, an initiator detects if it is starved or if its targets are starved, and notifies other initiators that may have contributed to the starvation.

FIGS. 5–8 are flowcharts that summarize the monitoring actions. Pseudocode describing the details of these actions is shown in Table 4.

TABLE 4

Monitoring

In TimeoutThread( )
    if ReqWaitTime > ExpctdWaitTime, set Tstarve(me),
LongRespCnt + +
In IO Complete Thread( )
    if ReqWaitTime > ExpctdWaitTime, LongRespcnt - -
    if LongRespcnt = 0, clear Tstarve(me)
At Send(IO Request)
    if (WorkCnt -= Work) ≦ 0, (set SendPing; if immedPing, Ping( ); if Throttle, set BlockReqs)
    if NoReqs, (set SendPing; if Immedping, Ping( ))
At t(Ping)
    WorkUnit = BusKBperTp / Count(Valid(all))

TABLE 4-continued

Figure 5:
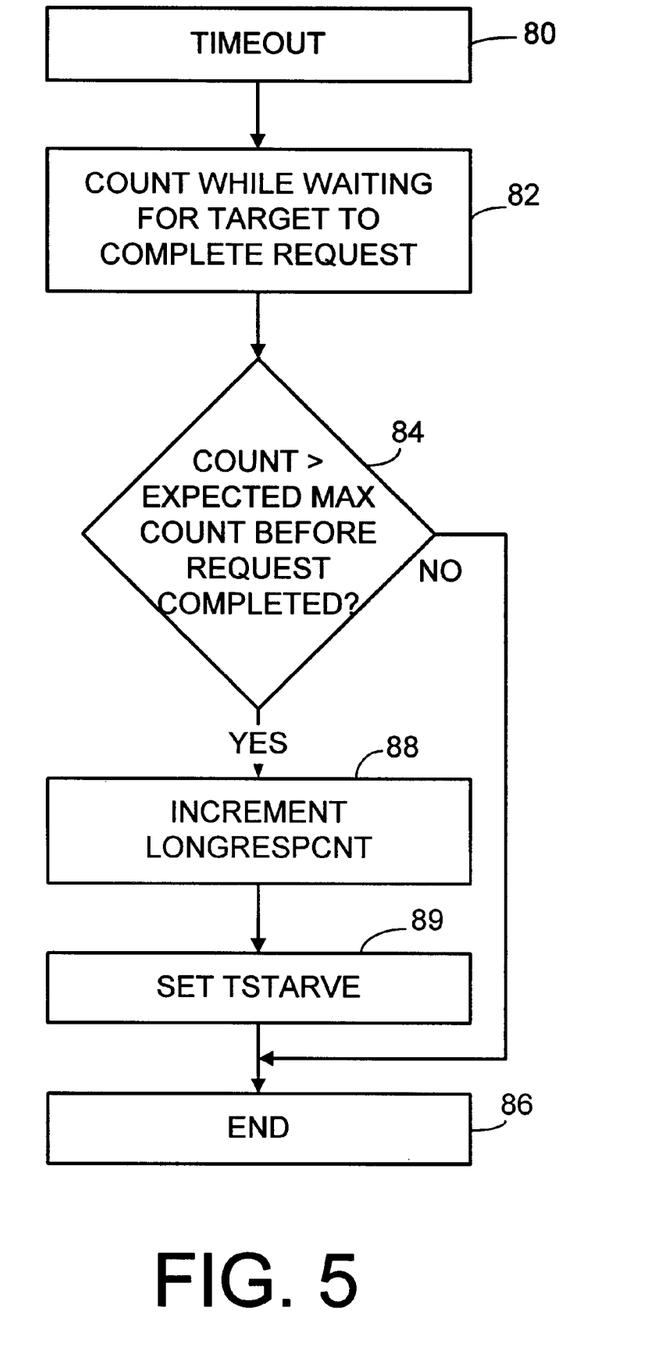
FIG. 5 is a flowchart of a method of determining in accordance with the invention if a target is starved for access to the SCSI bus.

Monitoring if SendPing, (Ping( ); WorkCnt = WorkUnit), else
  (set ImmedPing; WorkCnt += WorkUnit)
if NoReqs, set SendPing, else clear SendPing
if not(Istarve(all) and Valid(all)), clear BlockReqs A target is considered to be starved if its response to an initiator is taking longer than a specified time, such as an expected maximum time. Notification of target starvation is sent in pings to all initiators. FIG. 5 summarizes how an initiator through a timeout mechanism 80 determines if its targets are being starved. When an initiator sends an IO request on the bus 12 a count of elapsed time begins (step 82). The count is continually checked to determine if it exceeds an expected maximum count before the request is completed (step 84). If it does not, then the target response is considered timely and the timeout mechanism ends (step 86). If the count exceeds the expected maximum, LongRespCnt is incremented (step 88) and the initiator sets Tstarve so that its future pings indicate target starvation (step 89).

Figure 6:
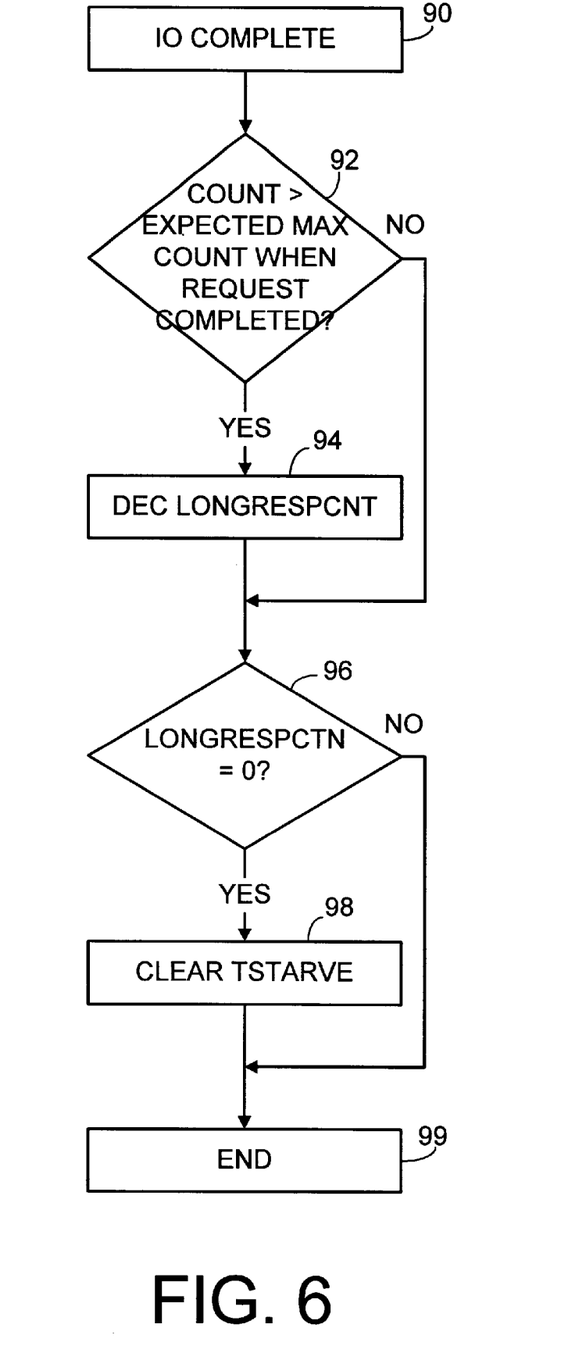
FIG. 6 is a flowchart of a method of determining in accordance with the invention if a target is no longer starved for access to the SCSI bus.

Future pings continue to indicate target starvation until all outstanding IO requests from the initiator have completed. FIG. 6 summarizes how it is determined when a request has completed, whether target starvation still exists. When an IO request completes (step 90), its associated count is checked to determine if it exceeded the expected maximum count (step 92). If it did (indicating that the particular request experienced target starvation), the LongRespCnt is decremented (step 94). If it did not (indicating it did not cause target starvation), LongRespCnt is not decremented. LongRespCnt is then checked to see if it equals zero (indicating no target starvation for any outstanding IO requests) (step 96). If it equals zero, the initiator clears Tstarve (step 98) so that the pings no longer indicate target starvation, and the IO complete ends (step 99). If it does not equal zero, then there is still target starvation and the initiator's pings continue to indicate so. The IO complete mechanism then repeats when another 10 request completes.

Figure 7:
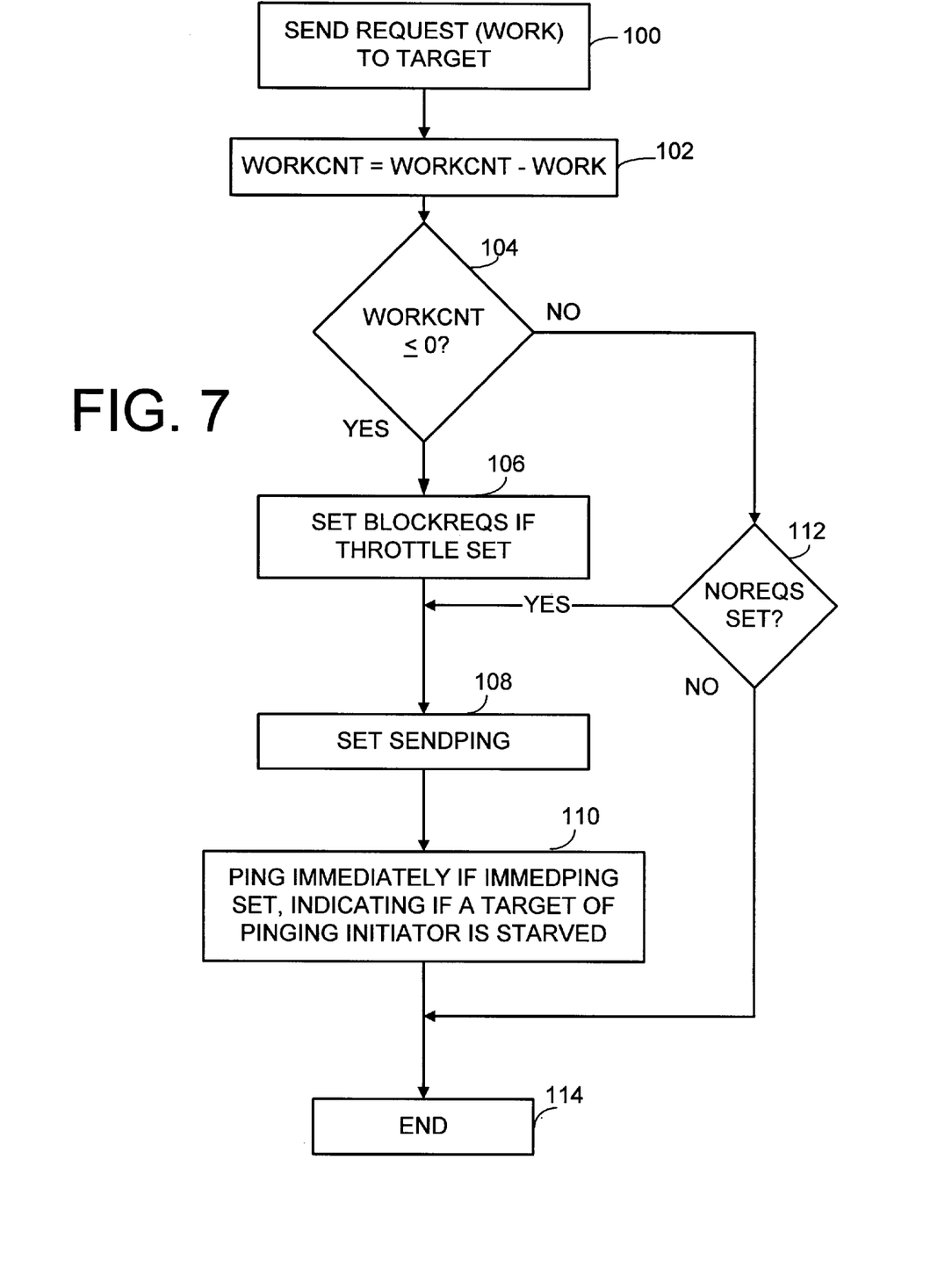
FIG. 7 is a flowchart of the process for determining in accordance with the invention if an initiator is starved for access to the SCSI bus.

FIG. 7 summarizes the action taken each time a requesting initiator sends a request to a target across the SCSI bus (step 100). The requesting initiator decrements its WorkCnt by the number of bytes associated with the request (the Work) (step 1 02) and checks if its WorkCnt is less than or equal to zero (step 104). A "yes" response indicates that it has been able to use its share of the bus bandwidth for the present ping period (step 104). If yes, the initiator sets its BlockReqs if its Throttle variable is set (indicating target starvation) (step 106). This step is taken because the requesting initiator has now consumed its share of the bus bandwidth and is not allowed to consume more until the target starvation ends. The initiator also sets SendPing so that it will ping next time it is scheduled to do so (step 108). The initiator then pings immediately if ImmedPing is set, which it will be if the initiator had been starved before sending this request (step 110). Otherwise, the initiator does not ping until the end of the ping period (step 114).

If the requesting initiator has not consumed all of its bandwidth share after sending the present request (step 104), it may still ping other initiators at this time if it does not have any pending requests. The initiator checks its NoReqs variable to see if it has other requests pending (step 112). If it does not, then it does not presently need the additional bandwidth and sets SendPing (step 108), effectively making the bandwidth available to higher-priority devices. However, if it does have other pending requests, the initiator does not set SendPing and does not ping the other initiators. Either way, the send request is complete (step 114).

Figure 8:
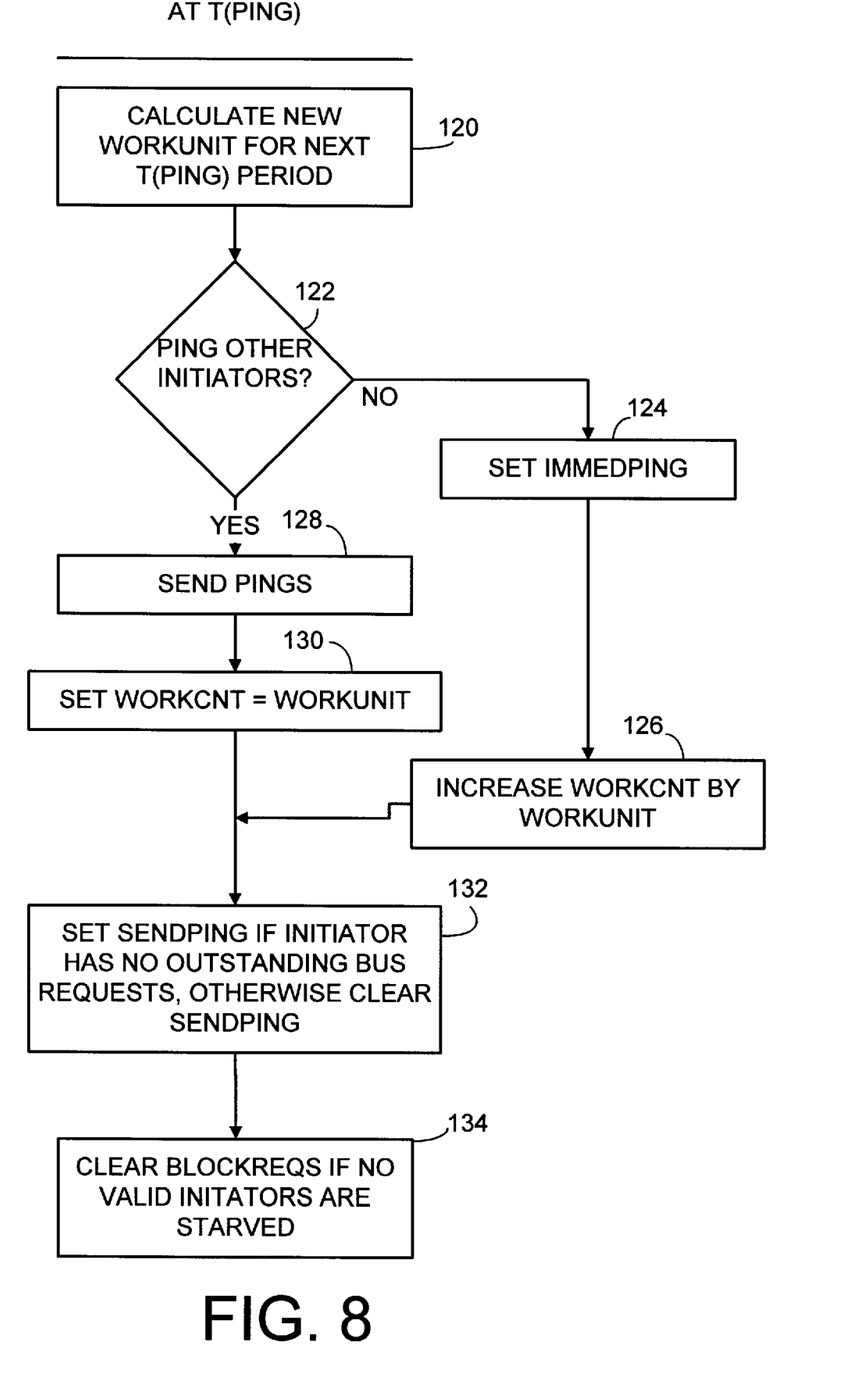
FIG. 8 is a flowchart of the steps taken in accordance with the invention by an initiator at the conclusion of each t(Ping) period.

FIG. 8 summarizes what occurs at the end of each ping period t(ping). The initiator calculates a new WorkUnit for the next period based on the number of valid initiators known at the time (step 120). The initiator then checks to see if its SendPing was set in the last ping period (see step 108 in FIG. 7), indicating it is not starved (step 122). If the initiator is starved (SendPing not set), it does not ping the other initiators. Instead, it sets ImmedPing (step 124) and increases its WorkCnt by the new WorkUnit (step 126) to take into account its failure to complete its prior WorkCnt. With ImmedPing set, the initiator will immediately ping other initiators once it catches up to the other initiators by completing its increased WorkCnt (see step 110 in FIG. 7). If the initiator is not starved (step 122), it pings the appropriate initiators (step 128) and adopts the new WorkUnit as its WorkCnt (step 130). In either case, the initiator then sets SendPing if it has no outstanding bus requests (step 132) and also clears BlockReqs if no valid initiators indicate that they are being starved (step 134).

Response to Notification of Initiator or Target Starvation

Notification of initiator starvation occurs when the time between pings received by a higher-priority indicator from a lower-priority initiator exceeds the ping period. In response, higher-priority initiators stop issuing new requests until a ping is received from the starved initiator. Notification of target starvation is contained in pings received from any initiator. In response, all initiators limit their requests to their share of the SCSI bus bandwidth, as defined in the initiator's WorkCnt.

If an initiator does not receive a ping from each lower-priority initiator within a t(Starve) period, the initiator stops issuing new requests to the SCSI bus. While so blocked, the initiator polls the initiator assumed to be starved to insure that failure is not the reason for lack of a ping. The blocked initiator resumes issuing new requests as soon as a ping is received from the starved initiator.

Upon notification of target starvation, each initiator sets its Throttle variable. When Throttle is set, the initiator stops issuing new requests once it has completed its WorkCnt and does not resume issuing new requests until the next ping period. The initiators remain limited in each subsequent ping period until the target starvation is gone. Since the WorkCnt for most initiators is WorkUnit, the bus margin and WorkCnt unused by the throttled initiators is normally available for the target to use.

A ping or poll from an initiator also ensures that the sending initiator is considered valid. Doing so in the poll case is not necessary, but it adds to robustness.

Figure 9:
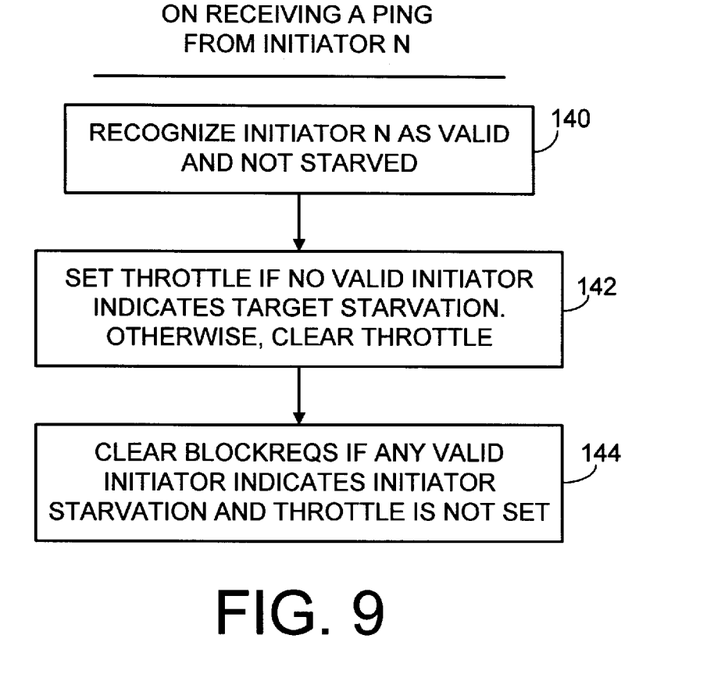
FIG. 9 is a flowchart of the steps taken in accordance with the invention by an initiator upon receiving a ping from another initiator.
Figure 10:
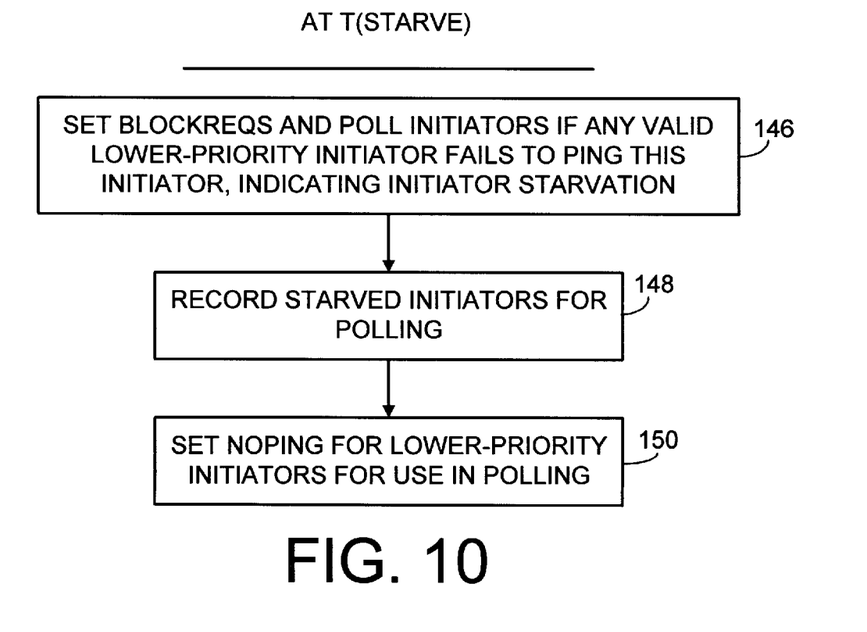
FIG. 10 is a flowchart of the steps taken in accordance with the invention by an initiator at the conclusion of each t(Starve) period.

The response of initiators to notification of initiator or target starvation is summarized in the flowcharts of FIGS. 9 and 10. Pseudocode describing the details of these responses is shown in Table 5.

TABLE 5

Response

On Received(Ping(n))
  set Valid(n)
  clear NoPing(n); clear Istarve(n); Tstarve(n) = Received(Ping(n))
  if Tstarve(all) and Valid(all), set Throttle, else clear Throttle TABLE 5-continued Response if not(Istarve(all) and Valid(all)) and not(Throttle), clear BlockReqs
On Received(Poll(n))
    set Valid(n)
At t(Starve)
    if NoPing(all) and Valid(all), (set BlockReqs; Poll( ))
    Istarve(all) = NoPing (all); set NoPing(<me)

FIG. 9 summarizes the action an initiator takes upon receiving a ping from another initiator. The initiator recognizes as valid and not initiator-starved each initiator n from which it receives a ping (step 140). The initiator then sets its Throttle variable (limiting it to its WorkCnt share of the SCSI bus bandwidth) if any pinging initiator indicates that it has target starvation. Otherwise, it clears Throttle (step 142). The initiator clears its BlockReqs if any valid initiator indicates initiator starvation (by failing to send a ping) and Throttle is not set (no target starvation indicated in received pings) (step 144).

FIG. 10 summarizes the action an initiator takes at the end of the t(Starve) period. The initiator sets its BlockReqs if any lower-priority initiator indicates initiator starvation and then polls the lower priority initiators (step 146). The initiator records the starved initiators for use during a subsequent polling in order to identify initiators that have been silent for two consecutive t(starve) periods (step 148). The initiator also sets NoPing for lower-priority initiators (step 150). It uses NoPing in this manner to limit the polling to lower-priority initiators.

Having illustrated and described the principles of the invention in an illustrative embodiment, it should be apparent to those skilled in the art that the illustrative embodiment can be modified in arrangement and detail without departing from such principles. For example, many of the steps of the various methods may be taken in orders different than shown in this embodiment. The flowcharts, for example, are intended only to summarize the various actions in the embodiment, not to detail specific orders in which steps may occur. All of the steps shown in the figures and described in the pseudocode need not necessarily be taken to practice the invention. The t(ping) and t(starve) time periods, for example, may be variable or constant, aperiodic or periodic, synchronous or asynchronous. Many of the software aspects of the embodiment may be implemented in hardware and many of the hardware aspects may be implemented in software.

In view of the many possible embodiments to which the principles of the invention may be applied, it should be understood that the illustrative embodiment is intended to teach these principles and is not intended to be a limitation on the scope of invention. The invention, rather, is defined in the following claims. We therefore claim as our invention all that comes within the scope of these claims.

We claim:

1. A method of assuring device access to a bus having a fixed priority arbitration scheme and a bus bandwidth wherein devices of higher and lower-priority compete for access to the bus, comprising:
    determining if a first device is prevented from gaining sufficient access to the bus by a second device; and
    if so, notifying the second device to limit sending new requests to the bus.

2. The method of claim 1 wherein the first device is a lower-priority device and the second device is a higher-priority device.

3. The method of claim 1 wherein the first device is assigned a share of the bus bandwidth and the determining comprises determining if the first device is prevented from using its share of the bus bandwidth by the second device.

4. The method of claim 1 wherein the determining comprises determining if the first device is prevented from gaining access to the bus for a specified time.

5. The method of claim 1 wherein the notifying comprises failing to send an access signal from the first device to the second device that indicates that the lower-priority device has sufficient access to the bus.

6. The method of claim 5 wherein the access signal is periodic.

7. The method of claim 5 including:
    polling the first device if it fails to send an access signal for a specified time; and
    if the first device is not detected by the poll, ignoring the failure of the device to send an access signal.

8. The method of claim 1 wherein the notifying comprises sending a signal to the second device that the first device does not have sufficient access to the bus.

9. The method of claim 1 wherein the second device is assigned a share of the bus bandwidth and the second device responds to the notification by limiting the sending of new requests to its share of the bus bandwidth.

10. The method of claim 1 wherein the second device responds to the notification by stopping the sending of new requests to the bus.

11. The method of claim 1 wherein the first device and second device are initiators.

12. The method of claim 1 wherein the first device is a target and the second device is an initiator.

13. A computer-readable medium on which are stored computer instructions for executing the method of claim 1.

14. A method of assuring device access to a SCSI bus having a bandwidth wherein devices of higher and lower-priority compete for access to the bus, comprising:
    assigning to a lower-priority device a share of the SCSI bus bandwidth;
    sending an access signal from the lower-priority device to a higher-priority device so long as the lower-priority device can use its share of the SCSI bus bandwidth;
    determining if the lower-priority device is prevented from using its share of the SCSI bus bandwidth by the higher-priority device; and
    if so, notifying the higher-priority device to limit new requests to the SCSI bus, the notifying comprising failing to send an access signal from the lower-priority device to the higher-priority.

15. The method of claim 14 wherein the higher-priority device responds to the notification by stopping the sending of new requests to the SCSI bus.

16. A method of assuring device access to a SCSI bus having a bandwidth wherein devices of higher and lower-priority compete for access to the bus, comprising:
    assigning to a first device a share of the SCSI bus bandwidth;
    determining if a second device is prevented from gaining access to the SCSI bus for a specified time; and
    if so, notifying the first device through a signal to limit the sending of new requests to the SCSI bus.

17. The method of claim 16 wherein the first device is a higher-priority device and the second device is a lower-priority device.

18. The method of claim 16 wherein the first device is a lower-priority device and the second device is a higher-priority device.

19. The method of claim 16 wherein the first device responds to the notification by limiting the sending of new requests to the SCSI bus to its share of the SCSI bus bandwidth.

20. A method of assuring device access to a SCSI bus having a bandwidth wherein devices of higher and lower-priority compete for access to the bus, comprising:

assigning to a lower-priority initiator a share of the SCSI bus bandwidth;

assigning to a higher-priority initiator a share of the SCSI bus bandwidth;

determining if the lower-priority initiator is prevented from using its share of the SCSI bus bandwidth by the higher-priority initiator;

if so, notifying the higher-priority initiator to limit new requests to the SCSI bus;

determining if a target associated with an initiator is prevented from gaining access to the SCSI bus for a specified time; and if so, notifying the initiators to limit the sending of new requests to the SCSI bus.

21. The method of claim 20 wherein the higher-priority initiator responds to the notification that the lower-priority initiator is prevented from using its share of the SCSI bus bandwidth by stopping the sending of new requests to the SCSI bus.

22. The method of claim 20 wherein the initiators respond to the notification that a target is prevented from gaining access to the SCSI bus by limiting the sending of new requests to the SCSI bus to their shares of the SCSI bus bandwidth.

23. The method of claim 20 wherein the lower-priority initiator notifies the higher-priority initiator by failing to send an access signal to the higher-priority initiator, the method further including:

polling the lower-priority initiator if the lower-priority initiator fails to send an access signal for a specified time; and if the lower-priority initiator is not detected by the poll, ignoring the failure of the lower-priority initiator to send an access signal to the higher-priority device.

* * * * *